United States Patent
Rossi et al.

(10) Patent No.: US 6,683,890 B1
(45) Date of Patent: Jan. 27, 2004

(54) METHOD AND CIRCUIT FOR IMPROVING THE POINTER PROCESSING IN SYNCHRONOUS DIGITAL HIERARCHY (SDH) TRANSMISSION FRAMES

(75) Inventors: Alessandra Rossi, Vimercate (IT); Alberto Lometti, Merate (IT); Luca Razzetti, Sesto San Giovanni (IT); Giovanni Traverso, Rovagnate (IT); Alberto Bellato, Bernareggio (IT); Sergio Cabrini, San Giuliano (IT); Claudio Girardi, Mezzolombardo (IT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/432,279

(22) Filed: Nov. 2, 1999

(30) Foreign Application Priority Data

Nov. 3, 1998 (IT) .......................... MI98A2354
Jul. 28, 1999 (IT) .......................... MI98A1674

(51) Int. Cl.$^7$ .............................................. G01R 31/08
(52) U.S. Cl. ........................ 370/907; 370/242; 370/244
(58) Field of Search ................................ 370/907, 516, 370/517, 505, 506, 242, 243, 241

(56) References Cited

U.S. PATENT DOCUMENTS

| | | | | |
|---|---|---|---|---|
| 5,539,750 A | * | 7/1996 | Kivi-Mannila et al. | 370/102 |
| 5,724,342 A | * | 3/1998 | Sihvola et al. | 370/242 |
| 6,094,440 A | * | 7/2000 | Sugawara et al. | 370/465 |

OTHER PUBLICATIONS

Andrew S. Tanenbaum, Computer Networks, 1996, Prentice Hall PTR, Third Edition, pp. 125–130.*
Recommendations: ITU–T G.707 (3/96).
Recommendations: ITU–T G.783 "Characteristics of Synchronous Digital Hierarchy (SDH) equipment functional blocks", Annex C–Algorithm for pointer detection.
ETS300 417–1–1, Jan. 1996, "Transmission and Multiplexing ™ Generic functional requirements for Synchronous Digital Hierarchy (SDH) equipment; Part 1–1: Generic processes and performance".

* cited by examiner

Primary Examiner—Dang Ton
Assistant Examiner—Robert W. Wilson
(74) Attorney, Agent, or Firm—Sughrue Mion, PLLC (57) ABSTRACT

A method and circuit are described for improving the pointer processing in the case of synchronous digital hierarchy (SDH) or synchronous optical network (SONET) transmission frames with VC4_4c, VC4_16c and VC4_64c concatenated payloads. The technique proposed by the existing Standards provides for two different state diagrams to be used in the pointer processing algorithm. One state diagram is used in the case of a concatenated payload and the other state diagram is used in the case of a non-concatenated payload. However, no solution is disclosed for automatically going from the states of one diagram to the states of the other diagram. The present invention provides a circuit so constructed that it can be used in an apparatus processing STM-4, STM-16 and STM-64 frames, through which the automatic recognition of the VC4-4c, VC4-16c and VC4-64c payload concatenation can be achieved. Therefore, it is not necessary to configure in advance the concatenation or non-concatenation condition.

10 Claims, 5 Drawing Sheets

METHOD AND CIRCUIT FOR IMPROVING THE POINTER PROCESSING IN SYNCHRONOUS DIGITAL HIERARCHY (SDH) TRANSMISSION FRAMES

BACKGROUND OF THE INVENTION

1. Field of Invention

The present invention relates to the field of synchronous digital transmissions and in particular to a method and implementation circuit that permit of improving the pointer processing in the event of payload contiguous concatenation in synchronous digital hierarchy (SDH) frames.

2. Description of the Prior Art

The Synchronous Digital Hierarchy (briefly, SDH) is known since the end of the Eighties and it will not be described in greater detail being considered as known to a person skilled in the art. The synchronous transport modules STM-N (N=1, 4, 16, 64) are characteristic features of the SDH transmission.

In view of the need to transport a lot of information, the payload of various frames can profitably be contiguously concatenated. The problem that payload contiguous concatenation has up to now been faced with is described in the following Recommendations: ITU-T G.707, ITU-T G.783 "Characteristics of Synchronous Digital Hierarchy (SDH) equipment functional blocks", Annex C—Algorithm for pointer detection (hereinafter referred to as Doc.1), and ETS300 417-1-1, January 1996, "Transmission and Multiplexing (TM); Generic functional requirements for Synchronous Digital Hierarchy (SDH) transmission equipment; Part 1-1: Generic processes and performance, Annex B (normative): Pointer interpretation (pages 102–105), (hereinafter referred to as Doc.2) which, to all intents and purposes, are intended to be an integral part of the present description, and as such are incorporated herein in their entirety by reference.

Docs. 1 and 2 show two different state diagrams to be used with the algorithm for pointer processing in case of concatenated payload or in case of non-concatenated payload. On the other hand, there is not disclosed any solution for automatically going from the states of one diagram to the other. Therefore, it is necessary to provide for a switch that permits of configuring the circuit in one of the two conditions.

SUMMARY OF THE INVENTION

A primary object of the present invention is to solve the above mentioned problem, and thus provide a means for automatically transitioning between the states of one diagram and those of another diagram.

The present invention provides a method and a circuit which can be represented through a state diagram containing therein both the diagrams contemplated by the Standards but which, through the introduction of one or more intermediate states and the special processing of data from individual pointer processors, does not require the prior configuration of the operation. Two different exemplary embodiments will be described in detail, with the first being extremely modular.

Further aspects of the invention will become clearer from the following detailed description, taken in conjunction with the attached illustrative drawings.

DESCRIPTION OF THE BEST MODE FOR CARRYING OUT THE INVENTION

Figure 1:
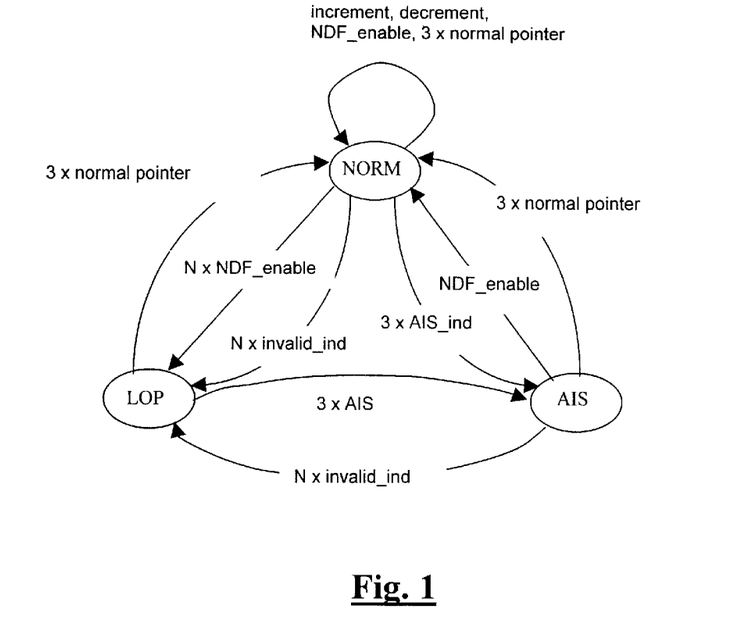
FIG. 1 is a state diagram used in the pointer interpretation circuits in the event of non concatenated payload (first embodiment)

FIG. 1 shows the state diagram used in the interpretation circuits of the AU4 pointer (see Doc. 1), where AU designates the Administrative Unit. The contemplated states are the following: NORM (Normal) corresponding to the normal state: LOP (Loss of Pointer) corresponding to the loss of pointer state; and AIS (Alarm Indication Signal) corresponding to the alarm indication state. The transitions from one state to the other are defined on the basis of consecutive events, such as receiving the AIS string (three consecutive AIS indications lead from a NORM state to an AIS state), the presence of a new pointer value or the presence of an invalid pointer value. For the description of the algorithm and for the conditions of transition from one state to the other, reference should be made to Doc. 1.

Lets consider now the event of concatenated payload AU4-Xc, where a number X (e.g., X=4, 16 or 64) of AU4's are concatenated so as to be able to transport a payload requiring a capacity higher than the one provided by a single VC4 container. The pointer of the first AU-4 has a range of normal values. As far as the other AU4's pertaining to AU-4-Xc are concerned, the concatenation string is contained in the bytes provided for the pointer. When the pointer interpretation circuits recognize this string, they activate the concatenation indication signal CONC_ind.

According to the standard shown in Doc. 1, the pointer interpretation circuit related to the event of concatenated payload provides for the states CONC (Concatenation), corresponding to the concatenation state, LOPC (Loss of Pointer in Concatenation), corresponding to the loss of pointer in concatenation state, and AISC (Alarm Indication Signal in Concatenation), corresponding to the alarm indication in concatenation state. The corresponding diagram is shown in FIG. 2 and also in this case, for the algorithm, reference should be made to Doc. 1.

The whole condition is defined by considering the states at which the pointer interpretation circuits of all the AU4's pertaining to AU4-Xc are. A correct concatenation condition occurs when the pointer interpretation circuit of the first AU4 (master) is in a non-alarm condition (NORM state) and the other circuits (slaves) are in the concatenation state (CONC) since they contain the concatenation string. The overall AIS state occurs when all the pointer interpretation circuits of the AU4-Xc's are in the AIS state. For all the other cases, the overall state is LOPC. For a more detailed explanation, reference should be made to Doc. 2.

Figure 2:
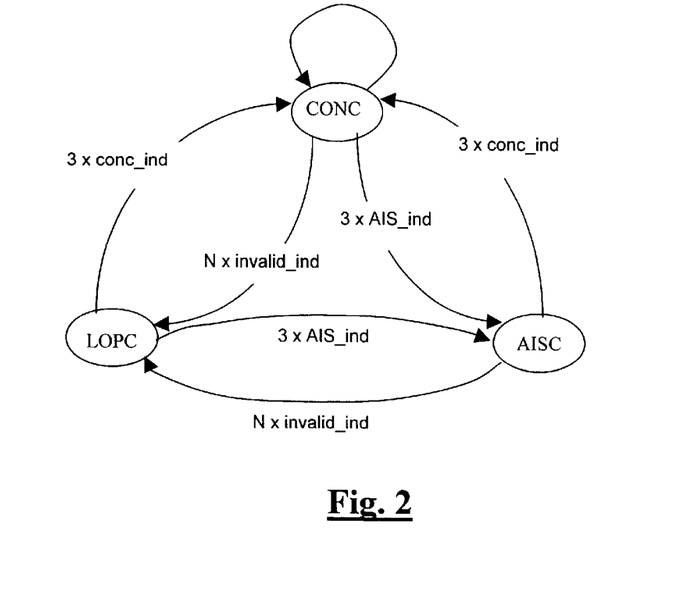
FIG. 2 is a state diagram used in the pointer interpretation circuits in the event of concatenated payload.

As will now be clear, in the diagrams of FIGS. 1 and 2, however, an automatic transition from the AU4 concatenation condition to the non-concatenation condition and vice versa is not contemplated. Indeed, the two diagrams relating to the concatenation and non-concatenation conditions are unconnected from each other and, therefore, a switch signal that permits the moving from one state diagram to another is required.

It is understood how the above situation can constitute a problem in the event, e.g., of a transmission network where an m:n protection scheme is applied and wherein, under normal condition, the protection path is used for extra traffic. In case of problems on the normal path, a switch on the protection path is carried out and therefore the extra traffic is replaced by the protected traffic; it is necessary for the extra traffic and the protected one to be both concatenated or non-concatenated if an external action for selecting the type of behavior to be adopted is to be avoided, so that the switch operation is faster.

By utilizing the circuit in accordance with the invention, the recognition of the concatenation or non-concatenation condition is automatic.

In the first embodiment of the invention, the construction of blocks managing the concatenation has been realized by means of a hierarchical and modular structure. This means that the different levels of the circuit have been conceived in such a way that, by using the first level, only the AU4-4c concatenation is managed, using the first and the second levels in cascade the AU4-4c and AU4-16c concatenations can be managed, while using all three levels in cascade the AU4-4c, AU4-16c and AU4-64c concatenations can be managed. Consequently, this has entailed the design of the three different types of circuit. while using the three levels in cascade the AU4-4c, AU4-16c and AU4-64c concatenations can be managed. This has entailed the design of the three different types of circuit.

The structure thus defined allows the use of these blocks in a precise manner taking the particularity of the application into account. This avoids the hardware oversizing in the systems in which the concatenation recognition is carried out with flows of maximum capability equal to STM4 or STM16.

Figure 3:
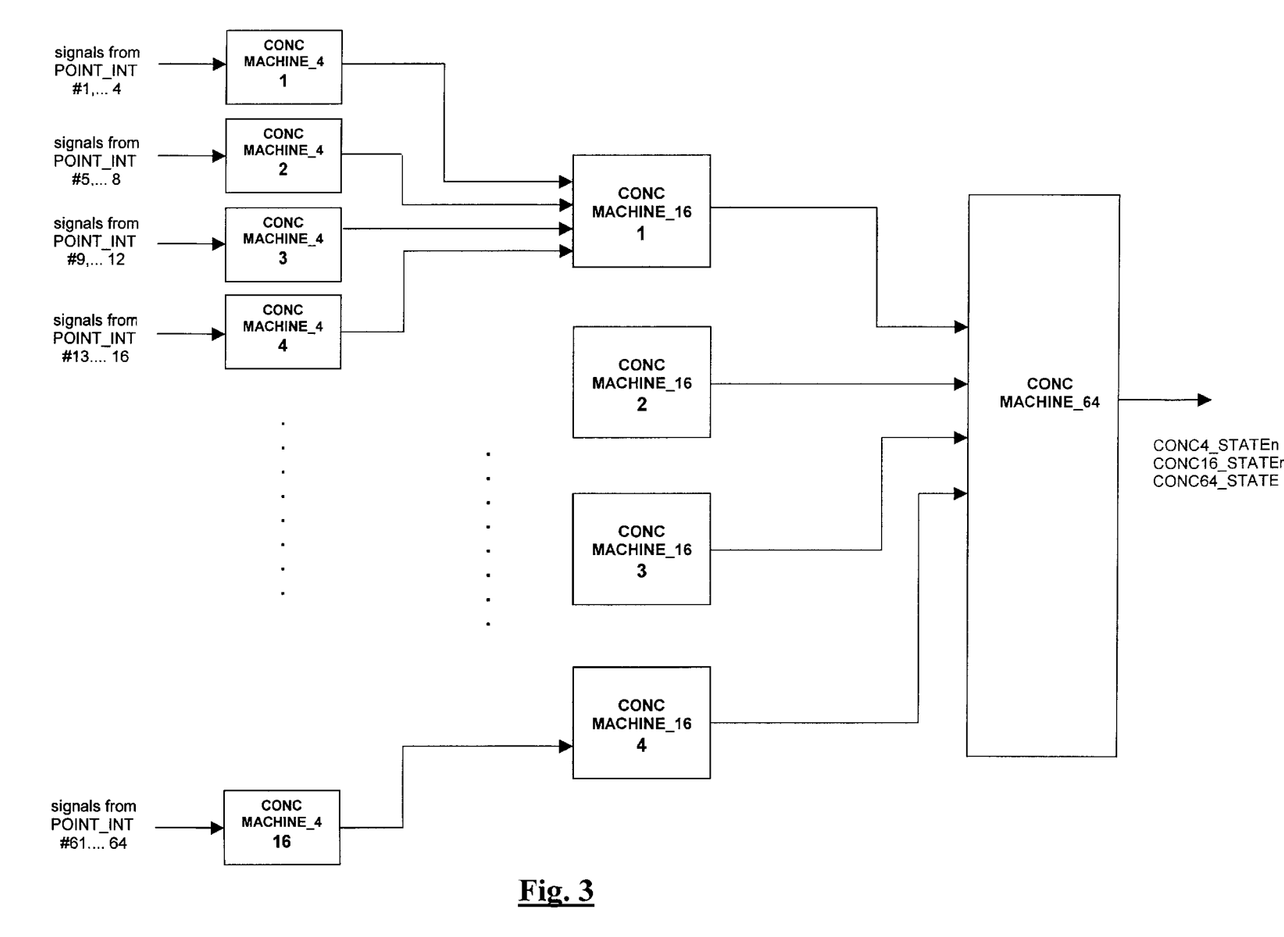
FIG. 3 is a complete block diagram for AU-4c, AU4-16c and AU4-64c concatenation.

In FIG. 3 there is illustrated the complete block diagram for the AU4-64c case. In case of concatenation for STM-4 frames it suffices to use a single CONC_MACHINE_4 block, in case of STM-16 frames it suffices to use four CONC_MACHINE_4 blocks and one CONC_MACHINE_16 block.

It should be noted that in the case of STM-16 the AU4-16c concatenation or one or more groups of VC4 with AU4-4c concatenation can be attained. In the case of STM-64, the AU4-64c concatenation or one or more groups of VC4 with AU4-4c or AU4-16c concatenation can be attained.

It is possible to force the operation mode that manages the concatenation according to what described by the regulations, if it is not wished to use the automatic recognition of the concatenation state.

Behavior CONC_MACHINE_4 Block

The circuit represented by block CONC_MACHINE_4 of FIG. 3 is recognizing a possible concatenation state on the basis of the indications received from the four independent circuits POINT_INT that process the AU4 pointers.

Circuit POINT_INT#1 is related to the first AU4 and can be both master and slave, depending on the overall concatenation state, while circuits POINT_INT#2, POINT_INT#3 and POINT_INT#4 can be only slave, should the related AU4's contain the concatenation indication.

The pointer interpretation circuits concerning the various AU4's operate in a rather independent manner, producing the AIS (AIS1, . . . , AIS4, in general AISx) and the LOP (LOP1, . . . , LOP4, in general LOPx) signals as defects; they can also generate the CONC (CONC1, . . . , CONC4, in general CONCx) signal, when they recognize the concatenation indication in the pointer.

The CONC_MACHINE_4 circuit receives these signals as input and evolves in a suitable manner: by controlling the signals generated by all the four pointer interpretation circuits, it can decide if the overall condition of the quadruplet is compatible with the existence of a concatenation state, if it indicates the presence of four independent (non-concatenated) AU4's or if it indicates an illegal state and therefore an error condition.

Figure 4:
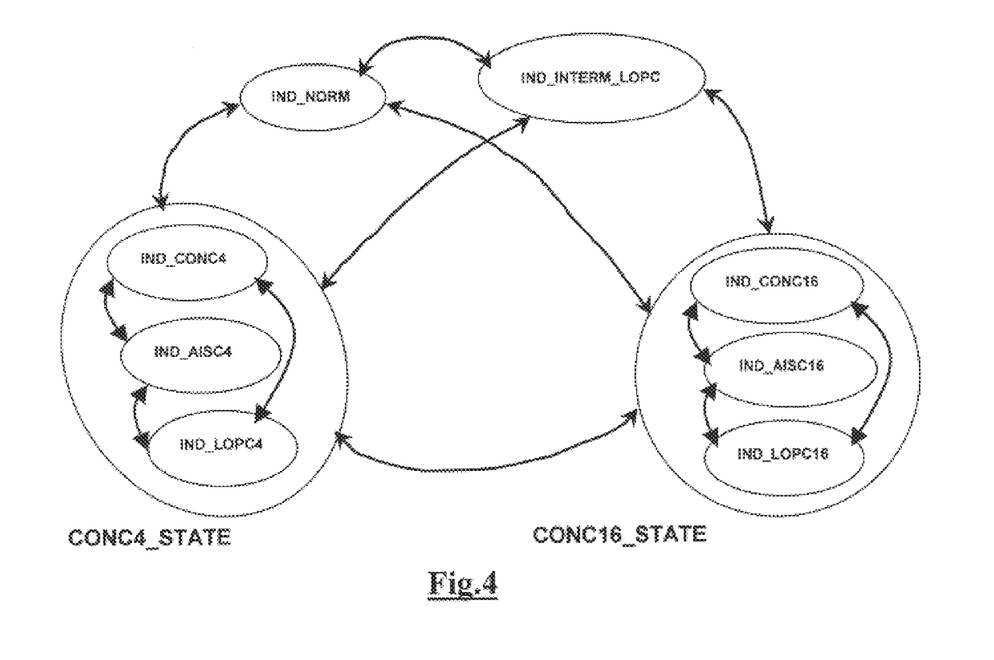
FIG. 4 is a state diagram for the steps carried out by the CON_MACHINE_4 block of FIG. 3.

The behavior of such a circuit, whose diagram is illustrated in FIG. 4, will be analyzed hereinafter. The IND_NORM state represents the non-concatenation case. Further, there are the states related to the case of payload constituted by four concatenated AU4's (AU4-4c) i.e. IND_CONC4, IND_LOPC4 and IND_AISC4 which together form a macrostate termed CONC4_STATE. There are also the states concerning the case of payload constituted by more than four concatenated AU4's (AU4-16c or AU4-64c), namely IND_CONC16, IND_LOPC16 and IND_AISC16 which together form a macrostate termed CONC16_STATE.

In the following description, Ni, Ai, Li, Ci (i=1,2,3,4) designate the signals generated by the single pointer processing blocks, indicating NORM, AIS, LOP, CONC respectively; NORMi, AISi, LOPi, CONCi (i=1,2,3,4) designate the states at which the single pointer processing circuits are, IND_NORM, IND_CONC4, IND_LOPC4, IND_AISC4, IND_CONC16, IND_LOPC16, IND_AISC16 and IND_INTERM_LOPC designate the states of the overall diagram of FIG. 4.

The diagram relating to the CONC_MACHINE_4 block evolves according to the following rules:

IND_NORM State

Each of the various AU4's is individually in the NORMi, AISi or LOPi states. When the NORM1+CONC2+CONC3+CONC4 condition occurs, i.e. CONC_MACHINE_4 block receives the N1, C2, C3, C4 signals, it evolves in the IND_CONC4 state; when the CONC1+CONC2+CONC3+CONC4 conditions occurs, i.e. the CONC_MACHINE_4 block receives the C1, C2, C3, C4 signals, it evolves into the IND_CONC16 state; when at least one of the AU4's goes to the CONCi state, i.e. a CONCx signal is received (but one is not in the NORM1+CONC2+CONC3+CONC4 or CONC1+CONC2+CONC3+CONC4 conditions) the IND_INTERM_LOPC state is reached.

IND_INTERM_LOPC State

This is the transition state from IND_NORM to IND_CONCn [n=4,16] in the case where the change is not direct, i.e. the slaves do not generate simultaneously the signals Cx [x=1,2,3,4]: one or more AU4 pointers contain the concatenation string, but the IND_CONC state has not been reached yet; if there is no longer any Cx indication, the circuit goes to the IND_NORM state; when the four AU4's are at NORM1+CONC2+CONC3+CONC4 state, the circuit evolves into the IND_CONC4 state; when the four AU4's are in CONC1+CONC2+CONC3+CONC4, the circuit evolves into the IND_CONC16 state.

IND_CONC4 State

This is the state envisaged when the first AU4 pointer interpretation circuit of the quadruplet generates the signal N1 and the other three concatenation indications C2, C3 and C4. If the machine does no longer receive any Cx indication, it goes to the IND_NORM state; when the state CONC1+CONC2+CONC3+CONC4 occurs, the circuit evolves into the IND_CONC16 state; when signals A1, A2, A3 and A4 are active, the block goes to the IND_AISC4 state; when even only one of the AU4's goes to any state different from those provided above, the circuit evolves into the IND_LOPC4 state.

IND_LOPC4 State

The circuit enters this state only starting from those states forming part of the CONC4_STATE macrostate. The various AU4's are in such a condition that the overall state results in being in neither the IND_CONC4 nor IND_AISC4 states. If there is no longer any CONCx indication, the circuit goes to the IND_NORM state. When the NORM1+CONC2+CONC3+CONC4 condition occurs, the circuit goes to the IND_CONC4 state; and when the CONC1+CONC2+CONC3+CONC4 condition occurs, the circuit goes to the IND_CONC16 state. When all pointers are in the AISi state, i.e., all the signals A1, A2, A3 and A4 are active, the machine evolves into the IND_AISC4 state.

IND_AISC4 State

The circuit enters this state only starting from states forming part of the macrostate CONC4_STATE. All four AU4's should be in the AISi state, i.e. the signals A1, A2, A3 and A4 must be active. If there is no longer any CONCx indication, the circuit goes to the IND_NORM state; when condition NORM1+CONC2+CONC3+CONC4 occurs, the circuit goes to the IND_CONC4 state; when CONC1+CONC2+CONC3+CONC4 condition occurs, the circuit goes to the IND_CONC16 state; when even only one of the AU4's goes to any state different from those considered above which allows it to stay at IND_AISC4 or to evolve into the IND_CONC4, IND_CONC16 or IND_NORM state, the circuit goes to IND_LOPC4 state.

IND_CONC16 State

This is the state envisaged when all the AU4 pointer interpretation circuits of the considered quadruplet generate the signals C1, C2, C3 and C4. If the machine does no longer receive any Cx indication, it goes to NORM_IND state; when NORM1+CONC2+CONC3+CONC4 occurs, the circuit evolves into the IND_CONC4 state. When signals A1, A2, A3 and A4 are active, the block goes to the IND_AISC16 state; when at least one of the AU4's goes to any state different from those considered above, the circuit evolves into the IND_LOPC16 state.

IND_LOPC16 State

The circuit enters this state only starting from those states belonging to the CONC16_STATE macrostate. All four AU4's must be in the AISi state, i.e., the signals A1, A2, A3, and A4 must be active. If there is no longer any CONCx indication the circuit goes to the IND_NORM state. When the CONC1+CONC2+CON3+CONC4 condition occurs, the circuit goes to the IND_CONC16 state; and when the NORM1+CONC2+CONC3+CONC4 condition occurs, the circuit goes to the IND_CONC4 state. When at least one of the AU4's goes to any state different from those described above relating to staying in the IND_AISC16 state or transitioning to the IND_CONC4, IND_CONC16 or IND_NORM states, the circuit goes to the IND_LOPC16 state.

IND_AISC16 State

The circuit enters this state only starting from states belonging to the CONC_STATE macrostate. All four AU4's must be in the AISi state, i.e. the signals A1, A2, A3, and A4 must be active, if there is no longer any CONCx indication the circuit goes to the IND_NORM state; when the CONC1+CONC2+CON3+CONC4 condition occurs, the circuit goes to the IND_CONC16 state; when the NORM1+CONC2+CONC3+CONC4 condition occurs, the circuit goes to the IND_CONC4 state; when at least one of the AU4's goes to any state different from those considered above in order to stay in IND_AISC16 or to evolve into the IND_CONC4, IND_CONC16 or IND_NORM state, the circuit goes to the IND_LOPC16 state.

Behavior of the CONC_MACHINE_16 Block

The circuit receives at its input, from the four CONC_MACHINE_4 blocks, the signals identifying the concatenation macrostates CONC4_STATEm and CONC16_STATEm (m=1, ..., 4), in addition to IND_NORM and IND_TERM_LOPCm indications. These signals are processed in order to establish if one or more AU4-4c concatenation states are present, or an AU4-16c concatenation state is present or if a possible AU4-64c concatenated flow, designated by IND_CONC64 in case of an STM-64 flow, is present. The evolution of the algorithm realized in the CONC_MACHINE_16 blocks, illustrated in FIG. 5, will be described hereinafter.

Case A

Figure 5:
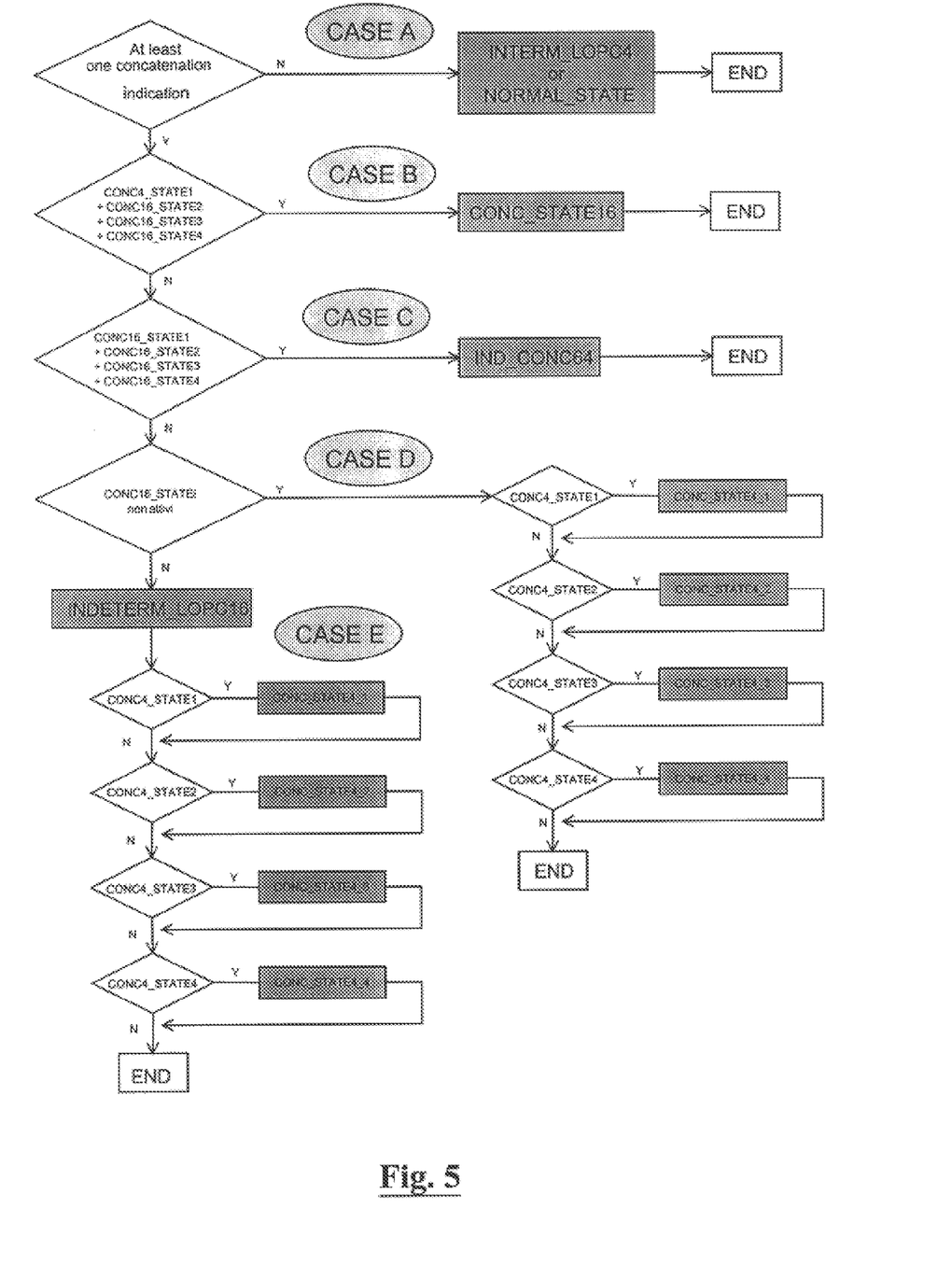
FIG. 5 depicts the steps of the method which are carried out in the CONC_MACHINE_16 block of FIG. 3.

The AU4-16c concatenation state is recognized when the CONC4_STATE1 and CONC16_STATEm (m=2, ..., 4) macrostates are active. An AU4-4c concatenation indication comes from the CONC_MACHINE_4#1; and indications of possible AU4-16c concatenations come from the remaining CONC_MACHINE4 (#2, #3, #4). The CONC16_STATE signal will then be activated.

The cases described hereinafter assume the presence of at least one of the macrostates CONC4_STATEm or CONC16_STATEm (m=1, ..., 4) active in the CONC_MACHINE_4 blocks.

Case B

The AU4-16c concatenation state is recognized as the CONC4_STATE1 and CONC16_STATEm (m=2, ..., 4) macrostates are active. An AU4-4c concatenation indication comes from the CONC_MACHINE_4#1; indications of possible AU4-16c concatenations come from the remaining CONC_MACHINE_4 (#2, #3, #4). The CONC16_STATE indication will be then activated.

Case C

A possible AU4-64c concatenation state is recognized. The concomitance of the following situations should occur: the CONC16_STATEm (m=1, ..., 4) macrostates must be active and all the CONC_MACHINE_4 machines must provide AU4-16C concatenation indications. Then the IND_CONC64_STATE signal will be activated.

Case D

The following situation occurs: at least one active CONC16_STATEm (m=1, ..., 4) macrostate is present, and at least one active CONC4_STATEm (m=1 ... 4) macrostate is also present.

The CONC4_STATEm is recognized at the machines that have provided the active indication. Against the other CONC4_STATEm machines, the CONC_MACHINE_16 block behaves in a transparent manner, i.e. it allows the IND_NORM and/or IND_INTERM_LOPC indications from CONC_MACHINE_4 blocks to pass.

Case E

One or more possible AU4-4c concatenations are present, with problems at AU4-16c concatenation level.

The concomitance of the following situations occurs: at least one active CONC16_STATEm (m=1, ..., 4) macrostate is present, but at least one active CONC4_STETm (m=1 ... 4) macrostate is anyway present.

An indication of incorrect operation is provided on the AU4-16c concatenation through the INDETERM_LOPC16 signal, whereas the CONC4_STATEm is recognized at the machines that have provided the active CONC4_STATE_m indication. Against the blocks that have not recognized the AU4-4c concatenation, the CONC_MACHINE_16 block behaves in a transparent manner, i.e. it allows the IND_NORM and/or IND_INTERM_LOPC indications from CONC_MACHINE_4 blocks to pass.

Behavior of the CONC-MACHINE-64 Block

Figure 6:
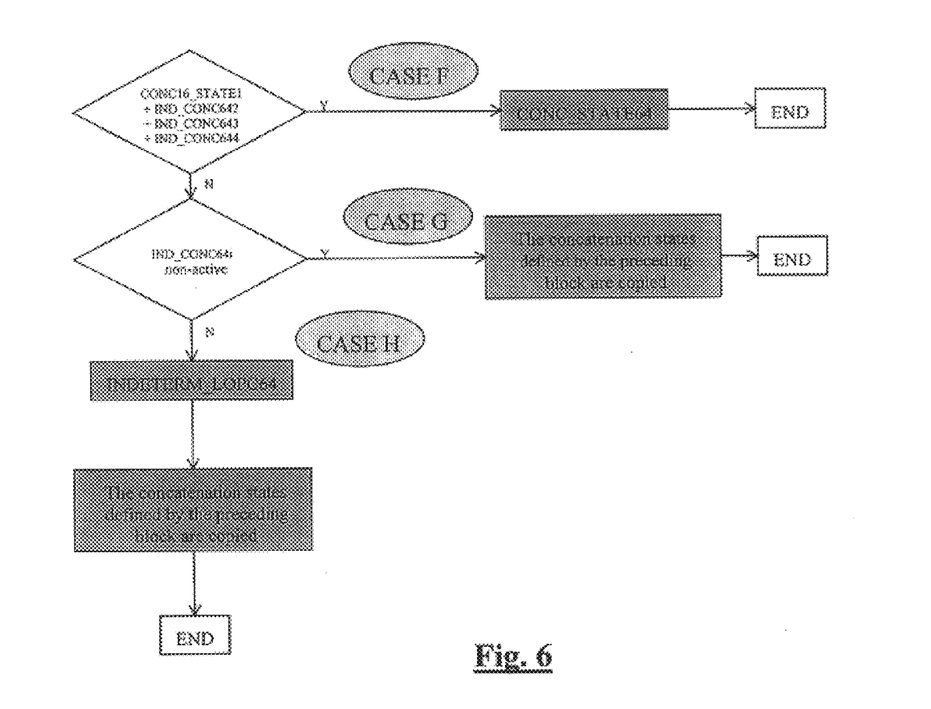
FIG. 6 depicts the steps of the method which are carried out in CONC_MACHINE_64 block of FIG. 3.

The circuit receives at its input the indications from the four CONC_MACHINE_16 blocks, generated according to the modalities described above. On the basis of this information the AU4-64c concatenation state, designated by CONC64_STATE, is defined in addition to the concatenation state AU4-4c and AU4-16c. In FIG. 6 there is depicted the decision algorithm of the concatenation states. Such an algorithm will be described hereinafter.

Case F

The AU4-64c concatenation state is recognized as valid. The concomitance of the following situations must occur: the CONC16_STATE1 macrostate along with the IND_CONC64m (m=2 . . . 4) signals must be active and an AU4-16c concatenation indication must come from the CONC_MACHINE_16#1; the active IND_CONC64 signals come from the remaining CONC_MACHINE_16 (#2, #3, #4). Then the CONC64_STATE indication is activated.

The cases described hereinafter assume the presence of at least one of the CONC4_STATEn (n=1, . . . , 16) or CONC16_STATEm or IND_CONC64m (m=1 . . . 4) active macrostates.

Case G

One or more independent AU4-4c and/or AU4-16c concatenations are required. The following situations must occur: no IND_CONC64m indication must be active and the active CONC4_STATEn and/or CONC16-STATEm indications must come from the CONC_MACHINE-16 blocks.

The concatenation states recognized by the CONC_MACHINE_16 blocks are defined in the CONC_MACHINE_64 block. The operation is transparent, i.e. the indications from the previous blocks are recopied at the output.

Case H

One or more independent AU4-4c and/or AU4-16c concatenations are recognized but with AU4-64c concatenation problems. In this event at least one IND_CONC64m indication is active and CONC4_STATEn and/or CONC16_STATEm active indications come from the CONC_MACHINE_16 blocks.

An indication of incorrect operation in relation to the AU4-64c concatenation is given through the INDETERM_LOPC64 signal while the CONC4_STATEn or CONC16_STATEm is recognized at the blocks that provided the active indications. The operation is transparent with respect to CONC_MACHINE_16 blocks i.e. the indications from the preceding blocks are copied at the output.

Figure 7:
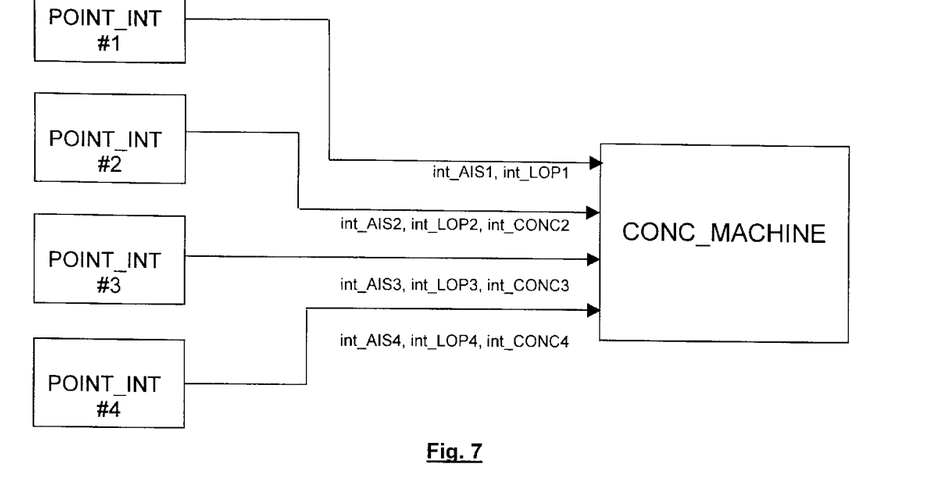
FIG. 7 depicts a block diagram for the pointer interpretation algorithm in case of concatenation and of non concatenation (second embodiment)

The diagram according to the second embodiment is obtained by a circuit which in FIG. 7 is represented by block CONC_MACHINE, for the AU4-4c concatenation case, while one should keep in mind that the present invention can be applied to a number of AU-4's different from four as well.

The pointer interpretation circuit POINTINT#1 (master) relates to the first AU-4, circuits POINT_INT#2–POINT_INT#4 (slaves) relate to the AU-4's whose pointer contains the concatenation information.

Each of the pointer interpretation circuits (POINT_INT#) relating to the various AU-4's operate in a complete independent manner, producing the int_AISi (int_AIS1, int_AIS2, . . . , int_AIS4) and the int_LOPi (int_LOP1, int_LOP2, . . . , int_LOP4) interpretation signals, as defects.

Blocks POINT_INT#2, POINT_INT#3 and POINT_INT#4 can generate also the int_CONCx (intCONC2, int_CONC3, . . . , int_CONC4) signal, when they recognize the concatenation indication in the pointer.

Circuit CONC_MACHINE receives these signals as inputs and evolves in a suitable manner: having the signals generated by all four pointer interpretation circuits, it can decide whether the whole condition is a concatenation or non-concatenation one.

Figure 8:
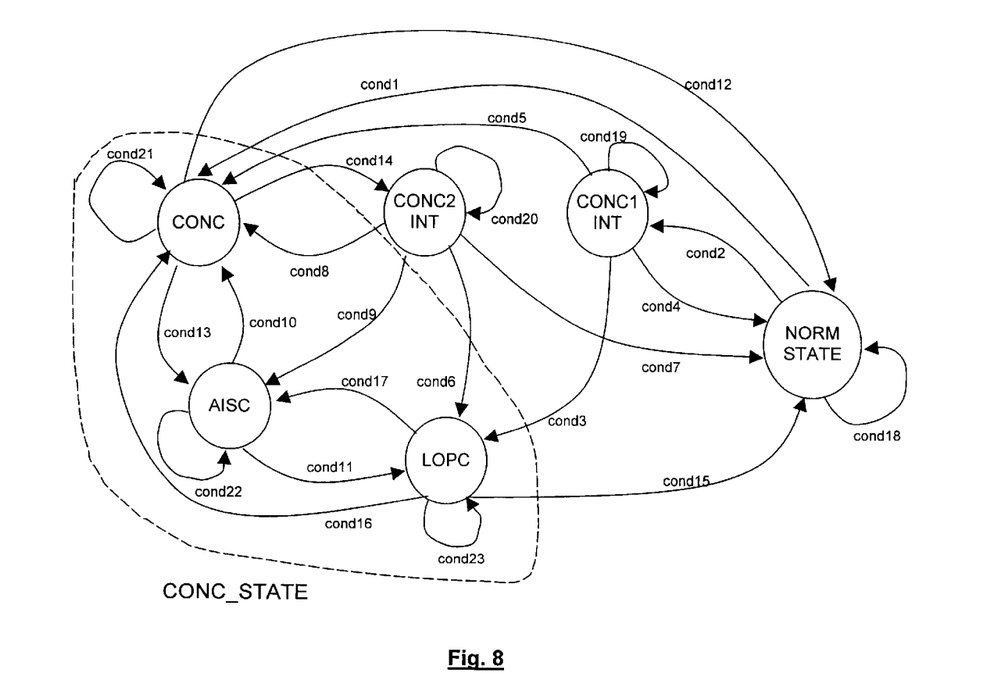
FIG. 8 depicts a possible state diagram for the pointer interpretation algorithm in case of concatenation and of non concatenation.

The operation of such a circuit represented by the related state diagram shown in FIG. 8 will now be analyzed.

In FIG. 8, the whole diagram of FIG. 1 is incorporated in the state NORM_STATE. There are also the states concerning the concatenated payload case, namely CONC, LOPC and AISC. These three states together form a "macrostate" termed CONC_STATE.

The present invention provides for the addition of at least one intermediate state. In the embodiment of FIG. 8, two intermediate states CONC1_INT and CONC2_INT are defined. The state CONC1_INT allows the transition from a non-concatenation condition to a concatenation one. The state CONC2_INT allows the transition from a concatenation condition to a non-concatenation condition.

In the following description int_NORMi, int_AISi, int_LOPi, int_CONCx (i=1,2,3,4; x=2,3,4) designate the signals generated by the individual pointer processing blocks, NORM1, AISi, LOPi, CONCx (i=1,2,3,4; x=2,3,4) designate the states in which the pointer processing circuits are and NORM_STATE, CONC_STATE, CONC, LOPC, AISC, CONC1_INT and CONC2_INT designate the states of the complete diagram of FIG. 8. The diagram evolves according to the following rules:

in the whole state NORM-STATE the each of the various AU-4's is in the NORMi, AISi or LOPi states. However, when condition NORM1+CONC2+CONC3+CONC4 occurs, i.e. block CONC_MACHINE receives signals int_NORM1, int_CONC2, int_CONC3, int_CONC4, it evolves into the CONC state (condition 1, briefly "cond1", of FIG. 8); similarly, when at least one of the AU-4's enters the corresponding state CONCx, i.e. an int_CONCx signal is received (but the condition is not NORM1+CONC2+CONC3+CONC4), the intermediate concatenation state CONC1_INT ("cond2") is reached. In practice, instead of going directly to the concatenation state CONC, it evolves into this intermediate state from which it will effectively go to the concatenation state CONC or it will turn back to NORM_STATE.

Therefore, CONC1_INT is the transitional state from NORM_STATE to CONC_STATE in the case where the transition is not immediate, i.e. when the three slaves do not generate the int_CONCx signals at the same time. One or more AU-4 pointers contain the concatenation string, but the CONC or LOPC state has not been reached yet: should this situation remain for a programmable value of j ms, the circuit evolves to LOPC state ("cond3"); if, on the other hand, there is not any concatenation indication int_CONCx, the circuit returns back to NORM-STATE ("cond4"). The third possibility consists in having NORM1+CONC2+CONC3+CONC4 and in this event the circuit evolves into the CONC state ("cond5").

As it will now be clear, similarly to what has been indicated for CONC1_INT, CONC2_INT represents the transitional state from the CONC_STATE to the NORM_STATE in the case where the transition is not immediate. One or more AU-4 pointers contain the concatenation string, but the CONC or LOPC state has not been reached. Should this situation remain for a predetermined time of k ms, the LOPC state ("Cond6" of FIG. 8) is reached. If to the contrary, there is no int_CONCx indication, the circuit goes to the NORM_STATE ("Cond7"). Alternatively, when NORM1+CONC2+CON3+CONC4 occurs, the circuit evolves into the CONC state ("Cond8"). Furthermore, if block CONC_MACHINE receives signals int_AIS1, int_AIS2, int_AIS3 and int_AIS4, it evolves into the AISC state ("cond9").

The circuit enters the AISC state only starting from states which belong to CONC_STATE. All the four AU-4's must be in the AISi state, i.e. signals int_AIS1, int_AIS2, int_AIS3 and int_AIS4 should be active. From the AISC state, when condition NORM1+CONC2+CONC3+CONC4 occurs, the circuit goes to CONC state ("cond10"); but when at least one of the AU-4's goes to any state different from those contemplated above to remain in AISC or to evolve to CONC state, the circuit goes to the LOPC state ("cond11").

As said above, the CONC state is the state which is provided when the pointer interpretation circuit of the first AU-4 generates the int_NORM1 signal and the other three generate the concatenation indication int_CONC2, int_CONC3 and int_CONC4. If the machine does not receive any int_CONCx indication, it goes to NORM_STATE ("cond12"); when signals int_AIS1, int_AIS2, int_AIS3 and int_AIS4 are active, the block goes to AISC state ("cond13"); when at least one of the AU-4's goes to any state different from those contemplated above, the circuit evolves into the CONC2_INT state ("cond14").

Lastly, in the LOPC state the various AU-4's are in such a condition that the whole state is neither AISC, nor CONC1_INT, nor CONC2_INT, nor CONC, nor NORM. From this condition, in case any INT_CONCx indication is missing, the circuit goes to the NORM_STATE ("cond15"); when, on the contrary, the condition NORM1+CONC2+CONC3+CONC4 occurs, the circuit goes to the CONC state ("cond16"); while when all pointers are in the AISi state, i.e. signals int_AIS1, int_AIS2, int_AIS3 and int_AIS4 are all active, the machine evolves into the AISC state ("cond17").

By means of a suitable selection signal it is obviously possible to exclude the intermediate states CONC1_INT, CONC2_INT and the NORM_STATE thus allowing the machine CONC_MACHINE to evolve according to the diagram of the standard referred to as Doc. 2, utilizing only the conditions: CONC(=NORM1+CONC2+CONC3+CONC4); AISC (=AIS1+AIS2+AIS3+AIS4) and LOPC (in all the other events).

Finally, it will now be clear how the provision of a state diagram including, in addition to the usual states concerning the pointer interpretation in SDH frames, also one or more intermediate states (preferably two intermediate states) allows the automatic recognition of the payload contiguous concatenation or non-concatenation conditions.

The present invention may indifferently be implemented through hardware or computer software capable of carrying out all the steps of the method. The invention extends to computer readable medium having a program recorded thereon, said computer readable medium comprising computer program code means adapted to perform all the steps of the method when said program is run on a computer.

It is apparent that numerous modifications could be made to the exemplary embodiments illustrated and described above without departing from the spirit and scope of Applicants' invention, as defined by the following claims.

What is claimed is:

1. A method of improving the processing of pointers in at least one of Synchronous Digital Hierarchy and Synchronous Optical Network transmission frames, comprising the steps of:
   interpreting said pointers relating to a plurality of Administrative Units of said transmission frames according to one of a Normal State Diagram corresponding to a normal non-concatenation state and a Concatenation State Diagram corresponding to a concatenation state;
   producing for each of said pointers:
      i) an alarm indication signal;
      ii) a loss of pointer signal;
      iii) a normal state signal; and
      iv) a concatenation signal to obtain a plurality of interpretation signals;
   processing the interpretation signals to determine whether an overall state is the normal non-concatenation state or the concatenation state; and
   automatically switching between said Normal State Diagram and said Concatenation State Diagram, according to said processing of the interpretation signals.

2. A method according to claim 1, wherein a change of the overall state from the normal non-concatenation state to the concatenation state occurs directly.

3. A method according to claim 1, wherein a change of the overall state from the normal state to the concatenation state occurs by passing through at least one intermediate state.

4. A method according to claim 2, further comprising the step of processing the interpretation signals to determine whether said concatenation state involves one or more Administrative Units of the AU4-4c, AU4-16c, or AU4-64c types, and to decide whether to change between said normal non-concatenation state and said concatenation state directly or through one or more intermediate states.

5. A circuit for improving the processing of pointers in at least one of Synchronous Digital Hierarchy and Synchronous Optical Network transmission frames, comprising:
   a first pointer interpreter, operating in an independent manner, for interpreting the pointers relating to a plurality of Administrative Units of said transmission frames according to one of a Normal State Diagram corresponding to a normal non-concatenation state and a Concatenation State Diagram corresponding to a concatenation state, said first pointer interpreter being operable to produce, for each of the pointers:
      i) an alarm indication signal;
      ii) a loss of pointer signal;
      iii) a normal state signal; and
      iv) a concatenation signal to obtain a plurality of interpretation signals;
   and a first processor for processing the received interpretation signals to determine whether an overall state is the normal non-concatenation state or the concatenation state and for automatically switching between said Normal State Diagram and said Concatenation State Diagram, according to said processing of the interpretation signals.

6. A circuit according to claim 5, wherein a change of the overall state from the normal state to a concatenation state occurs by passing through at least one intermediate state.

7. A circuit according to claim 6, further comprising a second processor for processing the signals coming out from said first processor in order to determine whether the concatenation state involves one or more Administrative Units of the AU4-4c, AU4-16c, or AU4-64c types, and to decide whether to change between the normal concatenation state and concatenation state directly or through said at least one intermediate state.

8. A computer program product comprising computer program code means adapted to perform a method of improving the processing of pointers in at least one of Synchronous Digital Hierarchy and Synchronous Optical Network transmission frames, when said program is run on a computer, said method comprising the steps of:

interpreting said pointers relating to a plurality of Administrative Units of said transmission frames according to one of a Normal State Diagram corresponding to a normal non-concatenation state and a Concatenation State Diagram corresponding to a concatenation state;

producing for each of said pointers:
i) an alarm indication signal;
ii) a loss of pointer signal;
iii) a normal state signal; and
iv) a concatenation signal, processing the interpretation signals to determine whether an overall state is the normal non-concatenation state or the concatenation state; and automatically switching between said Normal State Diagram and said Concatenation State Diagram, according to said processing of the interpretation signals.

9. A computer readable medium which stores a program operable for improving the processing of pointers in at least one of Synchronous Digital Hierarchy and Synchronous Optical Network transmission frames, when said program is run on a computer, said method comprising the steps of:

interpreting said pointers relating to a plurality of Administrative Units of said transmission frames according to one of a Normal State Diagram corresponding to a normal non-concatenation state and a Concatenation State Diagram corresponding to a concatenation state;

producing for each of said pointers:
i) an alarm indication signal;
ii) a loss of pointer signal;
iii) a normal state signal; and
iv) a concatenation signal, processing the interpretation signals to determine whether an overall state is the normal non-concatenation state or the concatenation state; and automatically switching between said Normal State Diagram and said Concatenation State Diagram, according to said processing of the interpretation signals.

10. A method according to claim 3, further comprising the step of processing the interpretation signals to determine whether said concatenation state involves one or more Administrative Units of the AU4-4c, AU4-16c, or AU4-64c types, and to decide whether to change between said normal non-concatenation state and said concatenation state directly or through said at least one intermediate state.

* * * * *